US012686227B2

(12) United States Patent
Clement

(10) Patent No.: US 12,686,227 B2
(45) **Date of Patent: *Jul. 21, 2026**

(54) METHOD FOR MANUFACTURING PANELS HAVING A DECORATIVE SURFACE

(71) Applicant: Unilin, BV, Wielsbeke (BE)

(72) Inventor: Benjamin Clement, Waregem (BE)

(73) Assignee: Unilin, BV, Wielsbeke (BE)

( * ) Notice: Subject to any disclaimer, the term of this patent is extended or adjusted under 35 U.S.C. 154(b) by 32 days.

This patent is subject to a terminal disclaimer.

(21) Appl. No.: 18/539,947

(22) Filed: Dec. 14, 2023

(65) Prior Publication Data

US 2024/0109364 A1 Apr. 4, 2024

Related U.S. Application Data

(63) Continuation of application No. 17/823,622, filed on Aug. 31, 2022, now Pat. No. 11,878,548, which is a (Continued)

(30) Foreign Application Priority Data

Jan. 10, 2014 (EP) .................................... 14150782

(51) Int. Cl.

| | |
|---|---|
| ***B44C 5/04*** | (2006.01) |
| ***B41J 2/01*** | (2006.01) |
| ***B41M 5/52*** | (2006.01) |

(52) U.S. Cl.

CPC .................................... *B44C 5/04* (2013.01); *B41J 2/01* (2013.01); *B44C 5/0469* (2013.01); *B41M 5/5218* (2013.01); *B41M 5/5254* (2013.01)

(58) Field of Classification Search

CPC ............ B44C 5/04; B44C 5/0469; B41J 2/01; B41M 5/5218; B41M 5/5254

(Continued)

(56) References Cited

U.S. PATENT DOCUMENTS

| | | | |
|---|---|---|---|
| 3,769,143 | A | 10/1973 | Kulesza |
| 3,983,307 | A | 9/1976 | Power et al. |

(Continued)

FOREIGN PATENT DOCUMENTS

| | | | |
|---|---|---|---|
| CA | 1064778 | | 10/1979 |
| CN | 1973089 | A | 5/2005 |

(Continued)

OTHER PUBLICATIONS

Z. Lu et al., "Layer-by-layer nanoparticle coatings on lignocellulose wood microfibers", Colloids and Surfaces A: Physicochem. Eng. Aspects 292 (2007), Jun. 20, 2006, p. 56-62.

(Continued)

*Primary Examiner* — Jason S Uhlenhake
*Assistant Examiner* — Alexander D Shenderov
(74) *Attorney, Agent, or Firm* — Capitol City TechLaw

(57) ABSTRACT

A method is provided for manufacturing a printed paper layer. The method may involve providing the paper layer with a printed pattern. Providing the printed pattern may involve depositing water based inks using a digital inkjet printer. The water based inks may be pigment containing inks. The dry weight of the deposited pigment containing inks may be lower than 9 grams per square meter. The paper layer may include an inkjet receiver coating, such that the inks are deposited on the inkjet receiver coating. The total volume of the deposited pigment containing inks may be less than 15 milliliter.

18 Claims, 3 Drawing Sheets

Related U.S. Application Data continuation of application No. 17/136,448, filed on Dec. 29, 2020, now Pat. No. 11,465,439, which is a continuation of application No. 16/580,566, filed on Sep. 24, 2019, now Pat. No. 10,906,349, which is a continuation of application No. 15/689,294, filed on Aug. 29, 2017, now Pat. No. 10,471,769, which is a continuation of application No. 15/110,582, filed as application No. PCT/IB2015/050088 on Jan. 6, 2015, now Pat. No. 9,770,937.

(58) Field of Classification Search
USPC .......................................................... 347/101
See application file for complete search history.

(56) References Cited

U.S. PATENT DOCUMENTS

| | | | |
|---|---|---|---|
| 4,006,048 A | 2/1977 | Cannady, Jr. et al. | |
| 4,076,566 A | 2/1978 | Power | |
| 4,895,759 A | 1/1990 | Crawford | |
| 5,227,359 A | 7/1993 | Mikoshiba et al. | |
| 5,296,447 A | 3/1994 | Suto et al. | |
| 5,407,895 A | 4/1995 | Egashira et al. | |
| 5,478,631 A | 12/1995 | Kawano et al. | |
| 5,494,885 A | 2/1996 | Kudo et al. | |
| 5,612,280 A | 3/1997 | Takahashi et al. | |
| 5,639,539 A | 6/1997 | DeProspero et al. | |
| 5,712,222 A | 1/1998 | Shirai et al. | |
| 5,939,231 A | 8/1999 | Kawamura et al. | |
| 5,969,231 A | 10/1999 | Qu et al. | |
| 5,989,378 A | 11/1999 | Liu et al. | |
| 6,132,878 A | 10/2000 | Kojima et al. | |
| 6,174,095 B1 | 1/2001 | Desie et al. | |
| 6,291,127 B1 | 9/2001 | Dagan et al. | |
| 6,300,279 B1 | 10/2001 | Macedo | |
| 6,455,206 B1 | 9/2002 | Hasegawa et al. | |
| 6,517,674 B1 | 2/2003 | Das | |
| 6,551,694 B1 | 4/2003 | Imamichi et al. | |
| 6,599,592 B1 | 7/2003 | Schulz | |
| 6,605,337 B1 | 8/2003 | Mori et al. | |
| 6,617,674 B2 | 9/2003 | Becker et al. | |
| 6,632,488 B2 | 10/2003 | Okumura et al. | |
| 6,652,931 B1 | 11/2003 | Otani et al. | |
| 6,677,006 B2 | 1/2004 | Otani et al. | |
| 6,677,008 B2 | 1/2004 | Chen et al. | |
| 6,706,372 B2 | 3/2004 | Schulz et al. | |
| 6,773,104 B2 | 8/2004 | Cornelius et al. | |
| 6,818,685 B1 | 11/2004 | Chapman | |
| 6,821,584 B2 | 11/2004 | Tashiro et al. | |
| 6,835,676 B2 | 12/2004 | Kim et al. | |
| 6,843,560 B2 | 1/2005 | Romano, Jr. et al. | |
| 7,026,023 B2 | 4/2006 | Masuda et al. | |
| 7,029,096 B2 | 4/2006 | Weijkamp et al. | |
| 7,335,407 B2 | 2/2008 | Landry-Coltrain et al. | |
| 7,695,783 B2 | 4/2010 | Merkel et al. | |
| 7,854,799 B2 | 12/2010 | Hoogmartens | |
| 8,085,442 B2 | 12/2011 | De Waal | |
| 8,316,604 B2 | 11/2012 | Thiers | |
| 8,328,303 B2 | 12/2012 | Frati | |
| 8,500,230 B2 | 8/2013 | Thiers | |
| 8,771,811 B2 | 7/2014 | Takahashi et al. | |
| 9,321,278 B2 | 4/2016 | Clement et al. | |
| 9,566,823 B2 | 2/2017 | Clement et al. | |
| 9,770,937 B2 | 9/2017 | Clement | |
| 10,471,769 B2 | 11/2019 | Clement | |
| 10,814,648 B1 | 10/2020 | Clement et al. | |
| 10,906,349 B2 | 2/2021 | Clement | |
| 11,446,938 B2 | 9/2022 | Clement et al. | |
| 11,987,044 B2 | 5/2024 | Clement et al. | |
| 2001/0036552 A1 | 11/2001 | Otani et al. | |
| 2002/0022117 A1* | 2/2002 | Kitamura | B41M 5/52 428/32.34 |
| 2002/0043175 A1 | 4/2002 | Walker et al. | |
| 2003/0064208 A1 | 4/2003 | Yamada et al. | |
| 2003/0068473 A1 | 4/2003 | Okumura et al. | |
| 2003/0138599 A1 | 7/2003 | Kamikubo | |
| 2003/0148073 A1 | 8/2003 | Landry-Coltrain et al. | |
| 2003/0198885 A1 | 10/2003 | Tamagawa et al. | |
| 2004/0081773 A1 | 4/2004 | Ishida et al. | |
| 2004/0141041 A1 | 7/2004 | Tsutsumi et al. | |
| 2004/0209011 A1 | 10/2004 | Kondo et al. | |
| 2004/0261964 A1* | 12/2004 | Asano | B41M 5/506 162/137 |
| 2005/0171245 A1 | 8/2005 | Ni et al. | |
| 2005/0191443 A1 | 9/2005 | Sunagawa et al. | |
| 2005/0221024 A1 | 10/2005 | Teshima et al. | |
| 2006/0060101 A1 | 3/2006 | Nasser | |
| 2006/0088672 A1 | 4/2006 | Totani et al. | |
| 2006/0130421 A1 | 6/2006 | Nollet et al. | |
| 2006/0234027 A1 | 10/2006 | Huusken | |
| 2006/0279621 A1 | 12/2006 | Morohoshi | |
| 2007/0087138 A1 | 4/2007 | Koenig et al. | |
| 2007/0202263 A1 | 8/2007 | Kitamura et al. | |
| 2007/0283648 A1* | 12/2007 | Chen | E04F 15/02033 52/311.1 |
| 2007/0283847 A1* | 12/2007 | Nakahama | C09D 11/54 106/31.6 |
| 2008/0090032 A1 | 4/2008 | Perrin et al. | |
| 2008/0318008 A1 | 12/2008 | Wielstra et al. | |
| 2010/0047455 A1 | 2/2010 | Hoogmartens | |
| 2010/0253735 A1 | 10/2010 | Irita | |
| 2010/0282407 A1 | 11/2010 | van der Zwan et al. | |
| 2011/0159208 A1 | 6/2011 | Price | |
| 2011/0211012 A1 | 9/2011 | Irita | |
| 2011/0268897 A1 | 11/2011 | Klemann | |
| 2012/0021147 A1* | 1/2012 | Liao | B41M 5/5263 428/32.33 |
| 2013/0070017 A1* | 3/2013 | Fujii | B41J 2/14274 347/20 |
| 2013/0286088 A1 | 10/2013 | Ryberg et al. | |
| 2013/0295352 A1 | 11/2013 | Thiers et al. | |
| 2014/0023832 A1 | 1/2014 | Pervan et al. | |
| 2014/0028772 A1 | 1/2014 | Pervan | |
| 2014/0196618 A1 | 7/2014 | Pervan et al. | |
| 2014/0370209 A1 | 12/2014 | Walp | |
| 2016/0208121 A1 | 7/2016 | De Mondt et al. | |
| 2020/0130381 A1 | 4/2020 | Clement et al. | |

FOREIGN PATENT DOCUMENTS

| | | | |
|---|---|---|---|
| CN | 1628968 | | 6/2005 |
| CN | 101014468 | A | 8/2007 |
| CN | 101084125 | | 12/2007 |
| CN | 101204690 | A | 6/2008 |
| CN | 101378912 | A | 3/2009 |
| CN | 101541538 | A | 9/2009 |
| CN | 101925705 | A | 12/2010 |
| CN | 102501698 | | 6/2012 |
| CN | 103502018 | A | 1/2014 |
| CN | 101998896 | | 12/2014 |
| DE | 19725829 | C1 | 8/1998 |
| DE | 19715268 | A1 | 10/1998 |
| DE | 19916546 | A1 | 10/2000 |
| DE | 19945279 | C1 | 4/2001 |
| DE | 19955081 | C1 | 8/2001 |
| DE | 102004036664 | | 3/2006 |
| DE | 102004036922 | A1 | 3/2006 |
| DE | 102007013132 | A1 | 9/2008 |
| DE | 102007013135 | A1 | 9/2008 |
| EP | 0054405 | A1 | 6/1982 |
| EP | 0737591 | A1 | 10/1996 |
| EP | 1044822 | A1 | 10/2000 |
| EP | 1108529 | A2 | 6/2001 |
| EP | 1700689 | A1 | 9/2006 |
| EP | 1749676 | A1 | 2/2007 |
| EP | 1857511 | A1 | 11/2007 |
| EP | 1872959 | A1 | 1/2008 |
| EP | 1923223 | | 5/2008 |
| EP | 2050886 | A2 | 4/2009 |
| EP | 1290290 | B1 | 1/2010 |
| EP | 2132041 | B1 | 1/2011 |
| EP | 2293946 | B1 | 3/2011 |

(56) References Cited

FOREIGN PATENT DOCUMENTS

| | | | |
|---|---|---|---|
| EP | 2402154 | A1 | 1/2012 |
| EP | 2431190 | A2 | 3/2012 |
| EP | 2565035 | A1 | 3/2013 |
| EP | 2695745 | A1 | 2/2014 |
| EP | 2894044 | A1 | 7/2015 |
| JP | 8-197697 | | 8/1996 |
| JP | 10-747 | | 1/1998 |
| JP | 2001071447 | A | 3/2001 |
| JP | 2002-316397 | A | 10/2002 |
| RU | 2219065 | C1 | 12/2003 |
| RU | 2239031 | C2 | 10/2004 |
| RU | 2379198 | C2 | 1/2009 |
| WO | 9935335 | | 7/1999 |
| WO | 0196689 | A1 | 12/2001 |
| WO | 2004042168 | A1 | 5/2004 |
| WO | 2004074577 | A1 | 9/2004 |
| WO | 2005028750 | A1 | 3/2005 |
| WO | 2005116337 | A1 | 12/2005 |
| WO | 2006013469 | A1 | 2/2006 |
| WO | 2006130708 | A2 | 12/2006 |
| WO | 2007119888 | A1 | 10/2007 |
| WO | 2008110254 | A1 | 9/2008 |
| WO | 2008110275 | A1 | 9/2008 |
| WO | 2008134823 | A1 | 11/2008 |
| WO | 2009077561 | A1 | 6/2009 |
| WO | 2009080376 | A1 | 7/2009 |
| WO | 2009124704 | A1 | 10/2009 |
| WO | 2009153680 | A2 | 12/2009 |
| WO | 2010000358 | A1 | 1/2010 |
| WO | 2011124503 | A2 | 10/2011 |

OTHER PUBLICATIONS

Safety Data Sheet, HP Tinte C1892A—Black, Admitted prior art.

G. A. Smook, Handbook of pulp & paper terminology: a guide to industrial and technological usage, 2nd edition, Angus Wilde Publications Inc., 2001, p. 246,.

HP DesignJet 2500/2000CP Printer User's Guide, C4704A/ C4703A, Admitted prior art, p. 1-340.

Material Safety Data Sheet, HP Tinte C1893A—No. 93 Cyan, Admitted prior art.

Material Safety Data Sheet, HP Tinte C1895A—No. 95 Yellow, Admitted prior art.

Material Safety Data Sheet, HP Tinte C1894A—No. 94 Magenta, Admitted prior art.

Hue P. Le, "Progress and Trends in Ink-jet Printing Technology", Journal of Imaging Science and Technology, vol. 42, No. 1, Jan./ Feb. 1998, p. 49-62.

Zhenglin Tang et al., "Special Printing Technology", Printing Industry Press, Sep. 2007, p. 36-38.

Shlomo Magdassi, "The Chemistry of Inkjet Inks", World Scientific Publishing Co., Pte. Ltd., 2010, Chapter 7.

M. J. Moura et al., "The Use of Mercury Intrusion Porosimetery to the Characterization of Eucalyptus Wood, Pulp and Paper", Iberoamerican Congress on Pulp and Paper Research 2002, p. 1-7.

Monica Badila et al., "Evaluation of the compatibility between low pressure melamine (LPM) film printing substrates and inkjet inks," Eur. J. Wood Prod., 2012, p. 639-649, published online.

Edited by Jun Wu, "Printing and Packaging Materials", China Light Industry Press, 1st edition, 1st printing, Apr. 2006, p. 82-83.

Meiyun Zhang, "Processing paper and special paper", 3rd edition, Jan. 31, 2010, Bejing: China Light Industry Press, p. 114-116.

* cited by examiner

METHOD FOR MANUFACTURING PANELS HAVING A DECORATIVE SURFACE

This application is a continuation application of U.S. patent application Ser. No. 17/823,622 filed Aug. 31, 2022, which is a continuation of U.S. patent application Ser. No. 17/136,448 filed Dec. 29, 2020 (issued as U.S. Pat. No. 11,465,439 on Oct. 11, 2022), which is a continuation application of U.S. patent application Ser. No. 16/580,566 filed Sep. 24, 2019 (issued as U.S. Pat. No. 10,906,349 on Feb. 2, 2021), which is a continuation of U.S. patent application Ser. No. 15/689,294 filed Aug. 29, 2017 (issued as U.S. Pat. No. 10,471,769 on Nov. 12, 2019), which is a continuation application of U.S. patent application Ser. No. 15/110,582 filed Jul. 8, 2016 (issued as U.S. Pat. No. 9,770,937 on Sep. 26, 2017), which is a US National Phase Application of International Application No. PCT/IB2015/050088 filed Jan. 6, 2015, the entire contents of all of which are incorporated herein by reference.

This application claims priority under 35 USC § 119(a)-(d) to EP patent application No. 14150782.2 filed Jan. 10, 2014, the entire contents of which are incorporated herein by reference.

BACKGROUND

1. Field

The present invention relates to a method for manufacturing panels having a decorative surface, or, so-called decorative panels.

More particularly the invention is related to a method for manufacturing panels, wherein said panels at least comprise a substrate and a top layer, wherein said top layer comprises a paper layer having a printed pattern. The panels of the invention may relate to furniture panels, ceiling panels, flooring panels or similar, wherein these panels preferably comprise a wood based substrate, such as an MDF or HDF substrate (Medium or High Density Fiberboard) or a substrate consisting of or essentially made of wood particleboard.

2. Related Art

Traditionally, the decor or pattern of such panels is printed on paper by means of offset or rotogravure printing. The obtained paper is taken up as a decorative paper in a so called laminate panel. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to the EP 1 290 290, from which it is further known to provide a relief in said melamine surface during the same press treatment or pressing operation, namely by bringing said melamine surface in contact with a structured press element, for example a structured press plate.

The printing of paper by means of an analog printing process, such as by rotogravure or offset printing, at affordable prices inevitably leads to large minimal order quantities of a particular decorative paper and restricts the attainable flexibility. A change of decor or pattern necessitates a standstill of the printing equipment of about 24 hours. This standstill time is needed for exchange of the printing rollers, the cleaning of the printing equipment and for adjusting the colors of the new decor or pattern to be printed.

Providing the printed paper with resin can lead to expansion of the paper, which is difficult to control. Problems can arise, particularly in the cases where, like in the EP 1 290 290, a correspondence between the relief and the printed decor is desired.

With the aim of restricting the costs of decorative paper and of preventing expansion, a method is known, for example from the DE 197 25 829 C1, wherein the analog printing process, for example an offset process, is used to print directly on the plate shaped substrate, whether or not with the intermediary of preparatory layers, such as melamine based layers. The printed decor is finished with melamine based layers and the created whole is cured using a pressing operation. Directly printing on the plate may lead to inferior printing quality. Any inhomogeneity internally in the plate or at its surface has a high risk of telegraphing to the upper surface, thereby forming a visual defect at the surface of the finished decorative panel. The printing process furthermore shows the same problems regarding the attainable flexibility, as when printing on paper. Finally, any quality issue on the print will result in loss of valuable board material.

Instead of analog printing techniques digital printing techniques, especially inkjet printing technique, is becoming increasingly popular for the creation of decors or patterns, be it on paper or directly on a plate-shaped substrate possibly with the intermediary of preparatory layers. Such digital techniques can enhance the flexibility in the printing of decors significantly. Reference is made to the EP 1 872 959, WO 2011/124503, EP 1 857 511, EP 2 431 190 and the EP 2 293 946, where such techniques are disclosed.

The method of the invention more particularly at least comprises the step of providing said paper layer with thermosetting resin and the step of providing said resin provided paper layer with at least a portion of said printed pattern. Preferably multi color printed patterns are applied for the realization of a decor, e.g. representing a wood pattern, on the abovementioned paper layer. Such decor extends over the majority, or even over the totality of the resin provided paper layer. Such a technique is known as such for example from the EP 2 132 041, where a digital printer, more particularly an inkjet printer is applied. It has however been very difficult to reliably further process such printed paper for manufacturing laminate panels, such as in a DPL process, since pressing defects may originate in the resin surface and milling, drilling or sawing through the laminate surface or at the edge thereof often leads to splitting in the top layer. Furthermore the inks or dyes of the EP'041 may overly wet the paper layer and cause wrinkling effects or bleeding upon further handling of the printed paper, leading to an instable and/or slow production process. To solve this issue the EP'041 propose to immediately dry the printed paper layer.

SUMMARY

The present invention aims in the first place at an alternative method for manufacturing panels having a decorative surface, and seeks, in accordance with several of its preferred embodiments, to solve one or more of the problems arising in the state of the art.

Therefore the present invention relates to a method for manufacturing panels having a decorative surface, wherein said panels at least comprise a substrate and a top layer, wherein said top layer comprises a paper layer having a printed pattern, and wherein said method at least comprises the step of providing said paper layer with thermosetting resin and the step of providing said resin provided paper layer with at least a portion of said printed pattern, with as a characteristic that for providing said portion of said printed pattern use is made of pigment containing inks deposited on said paper layer by means of a digital inkjet printer, and in that the dry weight of the total volume of said pigment containing inks deposited on said paper layer is 9 grams per square meter or lower, preferably 3 to 4 grams per square meter or lower, wherein for said pigment containing ink use is made of a water based ink.

The present invention combines several measures that can enable an industrial and reliable application of a digitally printed paper layer in the production of laminate panels.

A first measure is providing the printed pattern, or at least a portion thereof, on a paper layer that has been provided with resin. This measure improves the stability of the paper. In such cases at least a portion of the expansion or shrinkage due to the resin provision takes place before printing. Preferably the resin provided paper layer is dried before printing, for example to a residual humidity of 10% or less. In this case the most important portion of the expansion or shrinkage of the paper layer is neutralized.

This first measure may further assure complete impregnation of the paper layer, such that the obtained laminate top layers are less prone to splitting. Complete impregnation has proven to be difficult to attain after digital printing, especially when use is made of pigment containing inks. Complete impregnation is desired to reduce the risk of splitting in the printed paper layer of a decorative panel.

A second measure is using a digital inkjet printing operation. By this measure flexibility is largely increased as compared to analog printing techniques. According to the most preferred embodiment, use is made of a drop-on-demand inkjet printer, wherein only the desired ink droplets are fired or jetted from the nozzles of the print heads. It is however not excluded that use would be made of a continuous inkjet printer, wherein continuously ink droplets are fired from the nozzles of the print heads, but wherein the undesired droplets are carried away and do not reach the resin provided paper layer to be printed.

A third measure is the use of pigment containing inks. These inks provide for a high enough chemical and UV resistance of the printed pattern, and provide an acceptable color richness. As compared to inks consisting of dyes, pigment containing inks assure a lower bleeding into the paper layer. The use of pigmented inks, in accordance with the present invention, has the advantage that the pigment stays on the surface of the paper. This is desirable, because less ink is needed to create the same intensity of color. The problems created by such inks are counteracted by the other four measures of the invention. One of these problems is concerned with difficulties arising when impregnating such printed paper layer. This problem is solved, or at least alleviated, by the abovementioned first measure. A second one of these problems is concerned with difficulties arising when pressing or heating such printed paper layer in an attempt to cure the available resin. This problem is solved, or at least alleviated, by the below mentioned fourth and fifth measures. It may further be alleviated by the optional sixth measure.

A fourth measure is the limitation of the dry weight of the applied ink. This limitation leads to a layer of ink that lowers the risk of pressing defects and splitting in the top layer. Indeed, possible interference between the ink layer and the thermosetting resin during the pressing operation is limited. Because the ink load is limited to a maximum of 9 grams per square meter, wrinkling or expansion of the paper due to the ink can be brought to an acceptable level, which assures stable further processing.

A fifth measure resides in that for said pigment containing ink use is made of a water based ink. Water based inks are more economical than UV curable inks, and form a lesser problem regarding compatibility with thermosetting resins, such as melamine resins. Water based inks are inks of which the vehicle comprises water, or substantially consists of water. Conventionally a loss of definition may originate with water based inks, however the above referenced four measures of the invention limit this effect to a large extent and the optional below mentioned sixth measure may further enhance the obtainable definition.

As a consequence of these five measures, the invention further enables the formation of relief in the panels top layer by means of techniques similar to the prior art techniques of EP 1 290 290.

It should be noted that the above five measures bring about an important synergistic effect in that they enable reliable industrial application of digital printing of decor papers acceptable for use in laminate panels, as will be further explained in the remainder of the introduction of this patent application.

According to the most preferred embodiment of the present invention, a sixth measure is taken to even further enhance the attainable resolution and quality of the printed pattern, as well as the stability in further manufacturing processes needed to obtain the decorative panels. The said sixth measure concerns the availability of a separate ink receiving substance or ink receiving layer on the paper layer, upon printing. With "separate" it is meant separate from the resin provided on the paper layer. Preferably said inkjet receiver layer is free from said thermosetting resin upon printing, or contains less than 20 percent by weight, or even better less than 5 percent by weight of said thermosetting resin, based upon the total weight of the inkjet receiver coating, upon printing. The inventors have found that the amount of thermosetting resin available at the surface to be printed upon, particularly in the case of melamine based resins, is preferably limited. Indeed upon pressing the printed paper layer and curing the available resin in order to form a laminate top layer on a substrate, such as in a DPL process, the thermosetting resin flows and may thereby move the pigments, leading to a loss of definition and/or a distortion of the printed pattern upon pressing in the laminate press.

In accordance with said most preferred embodiment, said paper layer, prior to said step of providing said printed pattern, is provided with an inkjet receiver coating on the side thereof to be printed. Such inkjet receiver coating may further limit bleeding of the water based pigment containing ink upon printing. The water of the ink can be quickly absorbed into the ink receiver coating, while the pigment is caught at its surface. The inkjet receiver coating may lead to less wrinkling of the printed paper sheet. Said inkjet receiver coating may have several compositions. Here below some possibilities for the composition of the inkjet receiver coating are given without being exhaustive.

According to a first possibility, said inkjet receiver coating comprises at least a hydrophilic polymer, e.g. polyvinyl alcohol which is preferably at least partially but even better fully hydrolyzed. Possibly pigments are comprised in said inkjet receiver coating, such as silica pigments. When pigments are comprised in the inkjet receiver coating, the polymer may be acting as a binder for said pigments, thereby forming an example of the below second possibility.

According to a second possibility, said inkjet receiver coating at least comprises a binder and pigments, wherein, preferably, the pigment to binder ratio is comprised between 10:90 and 90:10, more preferably between 0.5:1 and 5:1, or even better between 1:1 and 3:1, e.g. 2:1. These preferred ratios of pigment to binder provide for sufficiently well bound pigments, such that the treated paper releases few dust. An excess of dust is fatal for clogging of the nozzles of the inkjet printing equipment, especially in the case of the present invention where water based inks are being used. Preferably said pigment is a porous pigment having a pore volume of between 0.5 and 3 ml/g, preferably Silica.

In general, when a binder is applied in said inkjet receiver coating, it is preferably selected from the list consisting of polyvinyl alcohol, starch, gelatin, cationic additives, precipitated calcium carbonate, polymer latex, vinylacetate/ethylene copolymer and carboxymethylcellulose. In the case of said polyvinyl alcohol, it is preferably at least partially or even fully hydrolyzed. For said cationic additives, use could be made of polydadmac, polyamine or alumina salts.

In general, when a pigment is applied in said inkjet receiver coating, it preferably has a mean particle size of 0.01 to 40 micrometer or 0.01 to 5 micrometer, and/or a pore volume of 0.5 to 3 ml/g.

As a suitable example for the pigment of said inkjet receiver coating use can be made of amorphous silica pigment.

The inkjet receiver coating of said sixth measure preferably has a weight of 0.5 to 10 grams per square meter, or even better between 1 and 6 grams per square meter or between 1.5 to 4.5 grams per square meter. Such a weight of the inkjet receiver coating represents a thickness which is sufficient to take up the water from the pigment containing inks, but is still thin enough to allow for the thermosetting resin to penetrate it during the pressing treatment, e.g. in a DPL process, such that any risk for splitting in the inkjet receiver layer is limited.

It is clear that according to a preferred embodiment, the optional inkjet receiving layer includes a polymer, preferably a water soluble polymer (>1 g/L water) which has a hydroxyl group as a hydrophilic structural unit, e.g. polyvinyl alcohol. According to variants, the inkjet receiving layer includes a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

As stated above preferred polymers for the inkjet receiving layer include polyvinylalcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL C118 from Nippon Goshei.

It is further clear that the inkjet receiving layer preferably further includes a pigment, more preferably an inorganic pigment and most preferably a porous inorganic pigment. Mixtures of two or more pigments may be used. For reasons of image quality, the particle size of the pigment should preferably be smaller than 500 nm. The pigment used is preferably an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides. The inorganic pigment is preferably selected from the group consisting of alumina hydrates, aluminum oxides, aluminum hydroxides, aluminum silicates, and silicas. Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 μm or less, and more preferably 200 nm or less. A preferred type of alumina hydrate is crystalline boehmite, or γ-AlO(OH). Useful types of boehmite include DISPERAL HP14, DISPERAL 40, DISPAL 23N4-20, DISPAL 14N-25 and DISPERAL AL25 from Sasol; and MARTOXIN VPP2000-2 and GL-3 from Martinswerk GmbH. Useful cationic aluminum oxide (alumina) types include α-Al2O3 types, such as NORTON E700, available from Saint-Gobain Ceramics & Plastics, Inc, and γ-Al2O3 types, such as ALUMINUM OXID C from Degussa. Other useful inorganic pigments include aluminum trihydroxides such as Bayerite, or α-Al(OH)3, such as PLURAL BT, available from Sasol, and Gibbsite, or γ-Al(OH)3, such as MARTINAL grades and MARTIFIN grades from Martinswerk GmbH, MICRAL grades from JM Huber company; HIGILITE grades from Showa Denka K.K. Another preferred type of inorganic pigment is silica which can be used as such, in its anionic form or after cationic modification. The silica can be chosen from different types, such as crystalline silica, amorphous silica, precipitated silica, fumed silica, silica gel, spherical and non-spherical silica. The silica may contain minor amounts of metal oxides from the group Al, Zr, Ti. Useful types include AEROSIL OX50 (BET surface area 50±15 $m^2/g$, average primary particle size 40 nm, SiO2 content>99.8%, Al2O3 content<0.08%), AEROSIL MOX170 (BET surface area 170 $g/m^2$, average primary particle size 15 nm, SiO2 content>98.3%, $Al_2O_3$ content 0.3-1.3%), AEROSIL MOX80 (BET surface area 80±20 $g/m^2$, average primary particle size 30 nm, SiO2 content>98.3%, Al2O3 content 0.3-1.3%), or other hydrophilic AEROSIL grades available from Degussa-Hüls AG, which may give aqueous dispersions with a small average particle size (<500 nm). Generally depending on their production method, silica particles are grouped into two types, wet-process particles and dry-process (vapour phase-process or fumed) particles.

In the wet process, active silica is formed through acidolysis of silicates, and this is polymerized to a suitable degree and flocculated to obtain hydrous silica. A vapour-phase process includes two types; one includes high-temperature vapour-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). The "fumed silica" means to indicate anhydrous silica particles obtained in the vapour-phase process.

For the silica particles possible used in the optional inkjet receiving layer of the invention, especially preferred are the fumed silica particles. The fumed silica differs from hydrous silica in point of the density of the surface silanol group and of the presence or absence of pores therein, and the two different types of silica have different properties. The fumed silica is suitable for forming a three-dimensional structure of high porosity. Since the fumed silica has a particularly large specific surface area, its ink absorption and retention are high. Preferably, the vapour-phase silica has an average primary particle diameter of 30 nm or less, more preferably 20 nm or less, even more preferably 10 nm or less, and most preferably from 3 to 10 nm. The fumed silica particles readily aggregate through hydrogen bonding at the silanol groups therein. Therefore, when their mean primary particle size is not larger than 30 nm, the silica particles may form a structure of high porosity, and effectively increase the ink absorbability of the layer containing them.

Alternatively, organic pigments may be used in the optional inkjet receiving layer, preferably chosen from the list consisting of polystyrene, polymethyl methacrylate, silicones, melamine-formaldehyde condensation polymers, urea-formaldehyde condensation polymers, polyesters and polyamides. Mixtures of inorganic and organic pigments can be used. However, most preferably the pigment is an inorganic pigment.

For fast ink uptake, the pigment/polymer ratio in the inkjet receiving layer is preferably at least 2, 3 or 4. To achieve a sufficient porosity for fast ink uptake the pore volume of these pigmented ink acceptance layers should be higher than 0.1 ml/g solids of the ink acceptance layer. This pore volume can be measured by gas adsorption (nitrogen) or by mercury diffusion. Fast ink uptake is desirable for achieving a swift production process with low risk of distorting the printed pattern when handling the decorative paper layer in subsequent production steps, such as upon stacking the printed papers, or rolling up the printed web.

Preferably the inkjet receiver coating of said sixth measure is obtained from a liquid substance which is deposited on the paper, and preferably forcibly dried e.g. in a hot air oven or by means of infrared or near infrared light or by means of microwave drying. Preferably the liquid substance is a water based suspension of at least said binder or hydrophilic polymer, and possibly said pigments. The deposition can be obtained in any way, possibly by means of printing, e.g. inkjet printing, but preferably by means of coating techniques, such as roller coating, spraying, metering rolls, bead coating, scattering, slot die coating. With the latter techniques preferably a coating is obtained that covers at least 80% of the surface of the paper layer. Preferably an excess of the liquid substance is firstly applied to the paper layer, and afterwards the excess material is taken off again, e.g. squeezed off, until the desired weight is obtained. Inline measurement systems may be desirable to steer and control the weight of the inkjet receiver coating. Such technique brings down the risk of obtaining uncoated areas of the paper, which could lead to local flaws in the printed pattern. A preferred equipment for application of the liquid substance is a coating device comprising reverse metering rollers. Such rollers may create a smooth coating surface.

The deposition of the liquid substance may be performed in an impregnation channel or, alternatively, on the printing equipment, immediately before the printing operation. This last case solves any possible issues with limited shelf life of the inkjet receiver coating. Preferably the deposition of the liquid substance is performed while the paper is still in an "endless" shape, namely taken from the roll without cutting. Such techniques allow for a more uniform application of the inkjet receiver coating. In the case the coating is done on the printing equipment, the printing equipment is hence preferably a roll-to-roll or a roll-to-sheet printer, comprising a coating device upstream of the print heads, for example a roller coater or additional printing heads suitable for printing the liquid substance for the inkjet receiver coating. Such additional printing heads, for example an additional row of printing heads, may have nozzles with a larger diameter than those used for the actual printing of the pattern. A resolution of 1 to 100, or even 1 to 25 dots per inch may suffice for these nozzles. The larger diameter allows for the jetting of more viscous substances.

It is clear that the present invention, in an independent manner, also relates to any equipment disclosed herein or suitable for performing the method of the invention. In particular a printing equipment comprising at least four print heads, characterized in that one print heads of said four print heads is able to print with a resolution of maximum 100 dpi or maximum 25 dpi, while the other three print heads of said four are able to print with a resolution higher than 100 dpi, preferably 250 dpi, 300 dpi or higher. The four print heads may extend in rows transversely to the paper to be printed upon. Preferably the printing equipment is a roll-to-sheet or roll-to-roll printer. The print heads may be suited for single pass, multi pass or plotter type printing. Any combination is possible. For example the low resolution heads may be suitable for single pass printing while the high resolution heads may be suitable for multi-pass printing. The printing equipment is preferably comprised in a manufacturing line for panels having a decorative surface, wherein said panels at least comprise a substrate and a top layer with a printed pattern.

Said liquid substance preferably comprises a solid content of 1 to 20% by weight and/or a viscosity of 10 to 75 seconds Din cup 4 at 20° C. Such properties allow for a straightforward application of the liquid substance to the surface of the paper layer, which is preferably already provided with thermosetting resin. In experiments, a solid content of about 12% and viscosity of about 24 seconds yielded a sufficiently uniform coating on a resin provided paper layer, e.g. when applied by means of a roller coater.

It is clear that the solid content of said liquid substance is preferably free from the thermosetting resin comprised in the resin provided paper layer or free from melamine based resin, or at most said solid content comprises 20 percent of said thermosetting resin or melamine based resin. The liquid substance hence comprises preferably a solid resin content of less than 4% by weight of such resin, namely less than 20% of the total dry content of said liquid substance, or none at all.

Said liquid substance may comprise, in addition to the above possible constituents of the inkjet receiver coating, at least a levelling agent, a preservative, an antifoaming agent, a dispersing agent, a hardener and/or a thickener.

For the levelling agent use could be made of APEO (alkyl phenol ethoxylates).

For the preservative use could be made of BIT or MIT (benzisothiazolinone or methylisothiazolinone).

For the antifoaming agent use could be made of polyether siloxane copolymer.

For the hardener use could be made of borate.

For the thickener use could be made of HEC (hydroxyethyl cellulose).

For the dispersing agent use could be made of sodium aluminate, polyphosphates or acrylates.

Preferably for said pigment containing ink use is made of organic pigments. Organic pigments are known to be more stable when exposed to sunlight, or other sources of UV radiation.

Preferably said pigments of said pigment containing ink have an average particle size of less than 250 nanometer.

Preferably said dry weight of deposited pigmented ink is 5 grams per square meter or less, for example 4 or 3 grams per square meter or less. Preferably the printed pattern is entirely, or at least essentially, made up of such pigmented ink, wherein the printed pattern covers the majority, and preferably 80 percent or more of the surface of said paper layer.

Preferably said total volume of deposited pigment containing ink is less than 15 milliliter, or even better less than 10 milliliter or still less, e.g. 5 milliliter or less.

Preferably said paper layer has a paper weight, i.e. without taking into account the resin provided on it, of between 50 and 100 grams per square meter and possibly up to 130 grams per square meter. The weight of the paper may not be too high, as then the amount of resin needed to sufficiently impregnate the paper would be too high, and reliably further processing the printed paper in a pressing operation becomes badly feasible.

Preferably for the paper layer use is made of a paper with a mean air resistance according to the Gurley method (Tappi T460) of below 30 or even better of about 25 seconds or below. Such paper has a rather open structure and is advantageous in the method of the present invention as it allows readily for impregnation of its core, as well as for water vapor to escape from it upon pressing. Such water vapor originates from the resin-water mixture that is provided on the paper layer, as well as from possibly from the curing reaction of the thermosetting resin.

Preferably said paper layer contains titanium oxide as a whitening agent.

Preferably said paper layer is provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

Preferably said paper layer is provided with such an amount of thermosetting resin, that at least the paper core is satisfied with the resin. Such satisfaction can be reached when an amount of resin is provided that corresponds to at least 1.5 or at least 2 times the paper weight. It should be clear that the resin which is provided on the paper layer, is not necessarily only available in the core of the paper, but may form surface layers on both flat sides of the paper. In the case that the sixth measure is practiced, the inkjet receiver coating is than present on the surface of the paper with the intermediary of such a surface layer of thermosetting resin. According to a special embodiment, the paper layer is firstly impregnated through or satisfied, and, afterwards, at least at the side thereof to be printed, resin is partially removed and possibly said inkjet receiver coating is provided.

Preferably the resin provided on said paper layer is in a B-stage while printing. Such B-stage exists when the thermosetting resin is not completely cross linked.

Preferably the resin provided on said paper has a relative humidity lower than 15%, and still better of 10% by weight or lower while printing.

Preferably the step of providing said paper layer with thermosetting resin involves applying a mixture of water and the resin on said paper layer. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or doctor blades to set the amount of resin added to the paper layer.

Preferably said thermosetting resin is a melamine based resin, more particularly a melamine formaldehyde resin with a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapor bubbles to the surface, however the present invention provides measures for limiting such hindrance. Also the optional sixth measure is beneficial in this regard as it may provide for an additional buffer for capturing such escaping vapor. When making use of an inkjet receiver coating which is porous and/or hydrophilic, some of the water vapor originating upon curing the thermosetting resin of the paper layer in the press may be taken up by this coating, such that the process is less prone to the origination of pressing defects, such as locked in water vapor bubbles. Other examples of such thermosetting resins leading to a similar polycondensation reaction include ureum-formaldehyde based resins and phenol-formaldehyde based resins.

As is clear from the above, the method of the invention preferably comprises the step of hot pressing the printed and resin provided paper layer, at least to cure the resin of the obtained resin provided decor paper. Preferably the method of the invention forms part of a DPL process as above described, wherein the printed resin provided paper layer of the invention is taken up in the stack to be pressed as the decorative layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

Preferably a further resin layer is applied above the printed pattern after printing, e.g. by way of an overlay, i.e. a resin provided carrier layer, or a liquid coating, preferably while the decor layer is laying on the substrate, either loosely or already connected or adhered thereto.

Preferably the pigment containing ink and the thermosetting resin is such that, upon printing, a jetted droplet of ink only slightly wets the resin provided paper layer or, in case the sixth measure is applied, the inkjet receiver coating. The contact angle at the interface between the droplet of ink and resin provided paper layer or the inkjet receiver coating is preferably between 0 and 90°, and even better between 10° and 50°. Allowing for a slight wetting or bleeding improves the permeability of the print for the resin and/or vapor bubbles, while maintaining a sufficient resolution of the print. The inventors have noted that sufficiently good properties are attained when the contact angle at the interface between a water droplet and the resin provided layer or the inkjet receiver coating shows the above values, namely preferably between 0 and 90°, and even better between 10° and 50°. A contact angle of about 50°, e.g. between 400 and 600 has been shown to give good results. Measuring the contact angle with water droplets places a smaller burden for any experimentation that would be needed to define the content of additives, primarily of wetting agent, in the resin or inkjet receiver coating, when necessary for realizing the above contact angle. In the event of some absorption of the water droplets, a short time should be allowed to lapse before measuring the contact angle, e.g. less than 10 seconds, such that a sufficiently stable measurement of the contact angle is attained.

Preferably said paper layer is a colored, pigmented and/or dyed base paper. The use of a colored and/or dyed base paper enables further limiting the dry weight of deposited ink for attaining a particular pattern or color. Preferably the dye or pigment is added to the pulp before the paper sheet is formed. According to an alternative the thermosetting resin provided on said paper layer to be printed is colored or pigmented. According to another alternative, the ink receiving layer on said paper layer to be printed is colored or pigmented with colored pigments.

Preferably said top layer comprises a layer of thermosetting resin above said paper layer having said printed pattern and above said printed pattern. It is in these situations that the invention is most useful. With such embodiments the layer of thermosetting resin above the printed pattern, and the thermosetting resin of the printed paper layer preferably interact and bind during a subsequent pressing operation. It is in the pressing operation that defects and the causes of future splitting may originate. According to the inventors these defects and other malicious effects are caused by the intermediate pigmented ink layer, e.g. by the dried vehicle thereof, which makes up a barrier for such interaction or binding. Such barrier also keeps chemical water, possibly originating from the polycondensation of the thermosetting resin, trapped in the top layer. Such locked-in bubbles of water or vapour lead to a loss of transparency of the top layer. Limiting the dry weight of deposited pigmented inks to 9 grams per square meter, and preferably to maximum 4 grams per square meter or below, can solve the issues of the barrier formation to a large extent. As explained above, the optional inkjet receiving layer may also form a buffer for such escaping vapor.

Clearly, the method of the invention preferably comprises the step of providing said layer of thermosetting resin above the printed pattern. Said layer of thermosetting resin provides for a transparent or translucent layer that enhances the wear resistance of the decorative panel. Preferably the decorative panel obtained by the method of the invention has a quality of at least AC2 or AC3 in accordance with EN 13329. With this aim hard particles, like aluminiumoxide particles, can be incorporated in such transparent or translucent layer. Particles having an average particle size of between 1 and 200 micrometer are preferred. Preferably an amount of such particles of between 1 and 40 grams per square meter is applied above the printed pattern. An amount lower than 20 grams per square meter can suffice for the lower qualities. The transparent or translucent layer may comprise a paper layer. Such paper layer preferably has a paper weight of between 10 and 50 grams per square meter, for example a so-called overlay commonly used in laminate panels. Preferably the step of providing said layer of thermosetting resin above the printed pattern involves a press treatment. Preferably a temperature above 150° C. is applied in said press treatment, e.g. between 180° and 220° C., and a pressure of more than 20 bar, e.g. between 35 and 40 bar.

According to a special embodiment said layer of thermosetting resin above said paper layer having said printed pattern is a layer of colored thermosetting resin. For example use can be made of a colored or pigmented overlay, wherein the colored resin is provided on a paper layer. The use of a colored resin enables further limiting the dry weight of deposited ink for attaining a particular pattern. According to a variant the paper layer of the overlay is colored in that it is provided with a print itself, preferably at the side thereof that is or will be directed to the substrate. Such print might also be a digital inkjet print by means of pigment containing inks and/or might be obtained by means of the method of the invention.

Preferably use is made of pigment containing inks of between 3 and 6 or even up to 8 different colors. The use of more than just the at least 3 base colors, e.g. more colors than Cyan, Magenta, Yellow and possibly black (CMYK), may lead to a lower need of deposited ink. One or more dedicated colors, whether or not supplementing the inks of the CMYK colors, might be used, such that these colors must not necessarily be formed by color addition of the several base colors, but can be created by jetting the dedicated color only. In the case of wood patterns, a brownish dedicated color might be used, thereby tremendously lowering the needed dry weight of deposited inks for the typical colors of wood patterns.

According to an important example said digital inkjet printer preferably uses at least two differently colored pigment containing inks, wherein both inks comprise reddish pigment.

According to another important example said digital inkjet printer uses CMYK colors and in addition at least a light yellow and/or a light magenta ink, i.e. an ink of a lighter yellow, respectively magenta than the base color Y, respectively M of the applied CMYK scheme.

According to still another important example said digital inkjet printer uses a dark pigment containing ink, having less than 1 percent by weight of carbon black pigment or being essentially free thereof, such as a dark brown colored pigment containing ink. Such an ink can be used instead of the typically carbon black pigment containing K color. The inventors have found particular problems of compatibility with the thermosetting resin, where carbon black containing ink is deposited.

Preferably a digital inkjet printer is applied that allows to jet ink droplets with a volume of less than 50 picoliters. The inventors have found that working with droplets having a volume of 15 picoliters or less, for example of 10 picoliters, brings considerable advantages regarding the limitation of dry weight of deposited inks.

Preferably a digital inkjet printer is applied that allows to work with ink droplets of several volumes in one and the same print, or with so-called halftone or gray scale. The possibility of half tone or gray scale printing enables further limitation of the dry weight of deposited ink while maintaining an excellent print definition.

Preferably a digital inkjet printer is applied that allows to attain a definition of at least 200 dpi, or even better at least 300 dpi (dots per inch).

Preferably said digital inkjet printer is of the single pass type, wherein the paper layer is provided with said printed pattern in a single continuous relative movement of the paper layer with respect to the printer or print heads. It is not excluded that other digital inkjet printers are used to put the invention into practice, such as so called multi-pass or plotter type printers. With printers of the single pass type, as well as with printers of the multi pass type the print heads preferably extend over the entire width of the paper to be printed. This is not the case with a plotter arrangement, wherein the print heads need to perform a scanning motion in the width direction of the paper layer. Such printers are however not excluded from being applied in the method of the invention.

It is noted that printers of the multi-pass type have the advantage that any failing nozzle can be hidden by the print of a subsequent pass. In this type of printers the nozzles can be shifted somewhat in between passes, such that on a particular location of the paper dots are printed by several nozzles. With a multi-pass equipment, or even with a plotter it is possible to perform automatic maintenance or cleaning in between subsequent passes, when needed. The issue with failing nozzles is especially relevant in connection to the present invention, since water based pigment containing inks are being used. Indeed, nozzles can get clogged by the pigment because the water has dried up. The risks of failing nozzles is lower e.g. with UV curable inks. Also, when the optional sixth measure is applied, the risk of failing nozzles rises. Any pigment contained in the inkjet receiver coating might cause dust and possible clogging of one or more nozzles over time. A multi-pass equipment or even a plotter can, in this case, enhance the time of autonomous production.

Preferably said digital inkjet printer is of the so-called roll-to-sheet type, wherein the paper layer is fed from a roll, printed upon, and subsequently cut to sheets. According to a first alternative the paper layer is fed from a roll, printed upon, and rolled back up again. According to a second alternative the paper is fed in sheet form, printed upon, and stacked sheet by sheet, e.g. on a pallet.

It is clear that, according to the most preferred embodiment of the present invention, the paper layer, while printing, is still flexible and that the paper layer is only attached or put on the plate shaped substrate after printing. According to a variant the paper layer is already attached or loosely laid on the plate shaped substrate while printing. The possible attachment with the substrate can be reached by means of urea based, phenol based, melamine based, polyurethane based glues and similar adhesives. Such attachment can be attained by means of a pressing treatment, whether or not a heated press treatment. Alternatively, the paper layer, after it has been provided with resin, in accordance to the invention, can be attached to the plate shaped substrate by locally welding it to the substrate, or, in other words, by locally hardening the available resin, and/or can be attached to the plate shaped substrate by ionization.

Preferably the method of the invention further comprises the step of applying a counter layer or balancing layer at the surface of the substrate opposite the printed paper layer The counter layer or balancing layer preferably comprises a paper layer and thermosetting resin, preferably the same resin as the top layer.

Preferably the mutual adherence of the plate-shaped substrate, the possible counter layer and the possible transparent or translucent layer is obtained in one and the same press treatment. According to the most preferred embodiment, the steps of the method of the invention are taken up in a DPL process.

According to the most important example of the invention, a standard printing paper, like the one used for rotogravure, having a weight between 60 and 90 grams per square meter is provided with melamine resin by means of a standard impregnation channel; namely by means of roller, immersion, jetting and/or spraying equipment. The resin provided paper layer is then dried until a residual humidity of less than 10%, preferably about 7%, is reached. The resin provided paper layer is then coated with a liquid substance at the side thereof to be printed. The liquid substance comprises a binder, preferably polyvinylalcohol and pigments, preferably amorphous silica. Possibly the same liquid substance is applied to the back of the paper to obtain a more stable treated paper. The paper is then again dried to a residual humidity of less than 10%, preferably about 7%. This treated paper layer is then printed by means of a digital inkjet printer, wherein use is made of water based pigment containing inks and an ink load of below 5 grams per square meter. A stack is formed of a resin provided counter layer, a plate shaped substrate, the printed resin provided paper layer and a resin provided paper layer forming a so-called overlay. The stack is then pressed during less than 30 seconds at a temperature of about 180-210° C. and a pressure of more than 20 bar, for example 38 bar. While pressing the surface of the stack contacts a structured press element, such as a structured press plate, and a relief is formed in the top layer of the obtained laminate panel. Possibly the obtained relief can be formed in register with the printed pattern of the resin provided paper layer. The latter is possible in all embodiments of the present invention.

According to a special embodiment of the invention a paper is impregnated from the side to be printed with a liquid substance comprising at least the binder or polymer of the inkjet receiver layer, and from the other side with at least said thermosetting resin, preferably mixed with water, wherein these impregnations may be performed inline with each other, with or without intermediate drying operation. Of course said liquid substance may comprise further constituents, e.g. the above mentioned pigments of such inkjet receiver layer, and possibly some thermosetting resin. Preferably said liquid substance is a water based suspension of at least said binder or polymer and said pigments, e.g. polyvinyl alcohol and silica pigments. The paper possesses a residual humidity of less than 10%, preferably about 7% when the printing operation by means of a digital inkjet printer is started. Use is made of water based pigment containing inks and an ink load of below 5 grams per square meter. A stack is formed of a resin provided counter layer, a plate shaped substrate, the printed resin provided paper layer and a resin provided paper layer forming a so-called overlay. The stack is then pressed during less than 30 seconds at a temperature of about 180-210° C. and a pressure of more than 20 bar, for example 38 bar. While pressing the surface of the stack contacts a structured press element, such as a structured press plate, and a relief is formed in the top layer of the obtained laminate panel. Possibly the obtained relief can be formed in register with the printed pattern of the resin provided paper layer.

It is clear that the invention also concerns panels that are obtained or are obtainable by means of a method in accordance with the present invention or in accordance with the above mentioned deviating embodiment thereof. Such panel has as a characteristic that it contains a plate shaped substrate and a printed pattern provided on a paper layer, wherein the pattern is at least partially obtained through digital inkjet printing of water based pigment containing inks and that the dry weight of the inks is less than 9 grams per square meter, preferably 3 to 4 grams per square meter or below. It is clear that the panel of the invention may have one or more further features equivalent to the features discussed in relation to the preferred embodiments of the methods of the invention. Preferably said panel further comprises a layer of thermosetting resin above said printed pattern.

It is further clear that the method is particularly suited to manufacture floor panels, furniture panels, ceiling panels and/or wall panels.

It is noted that problems with wrinkling are less an issue when the print is performed on the plate shaped substrate, however bleeding of water based inks is still prevalent. The inkjet receiver coatings described also enhance such methods of manufacturing decorative panels. For this reason, the present invention, in accordance with an independent aspect thereof, relates to a method for manufacturing panels having a decorative surface, wherein said panels at least comprise a plate shaped substrate and a top layer, wherein said top layer comprises a printed pattern, and wherein said method at least comprises the step of providing said plate shaped substrate with at least a portion of said printed pattern, with the characteristic that for providing said portion of said printed pattern use is made of water based, preferably pigment containing, inks deposited by means of a digital inkjet printer, and in that said plate shaped substrate comprises one or more intermediate layers at the surface to be printed, wherein said intermediate layers at least comprise an inkjet receiver coating, preferably as an uppermost layer, such that the inks are deposited on said inkjet receiver coating. Said intermediate layers may further comprise a paper, whether or not provided with resin. For example, a paper layer possibly already provided with an inkjet receiver coating may be attached or loosely laid on the plate shaped substrate while printing. The possible attachment with the substrate can be reached by means of urea based, phenol based, melamine based, polyurethane based glues or similar adhesives. Such attachment can be attained by means of a pressing treatment, whether or not a heated press treatment. Alternatively, a paper layer which has been provided with resin and possibly also already with said inkjet receiver coating can be attached to the plate shaped substrate by locally welding it to the substrate, or, in other words by locally hardening the available resin and/or can be attached to the plate shaped substrate by ionization. Preferably the method also comprises the step of applying translucent or transparent resin above the printed pattern with the aim of forming a transparent or translucent top layer above the print. Said resin may be liquidly applied in one or more coating steps with possibly intermediate drying, or may be applied by means of a resin provided paper layer, such as by a resonated overlay. Said resin may further comprise hard particles, like aluminumoxide, for enhance the wear resistance of the transparent or translucent top layer. Preferably the method also comprises the step of applying a counter layer or balancing layer at the surface of the substrate opposite the printed paper layer. The counter layer or balancing layer preferably comprises a paper layer and thermosetting resin, preferably the same resin as the top layer. The whole of possible counter or balancing layer, printed plate shaped substrate and possible transparent or translucent top layer is then preferably pressed using a press treatment similar or identical to a DPL press treatment.

It is clear that the printed pattern, the plate-shaped substrates and the paper layers mentioned above may have to be divided during the methods of the invention for obtaining their respective final dimensions. The panels obtained by means of a DPL press treatment or similar are preferably sawn or otherwise divided. Other treatments of the obtained panels are of course not excluded.

It is further clear that the treated paper layers described in connection to the invention independently represent inventive semi-products. A very interesting semi-product is a paper layer at least impregnated with thermosetting resin and comprising an inkjet receiver coating at at least one side thereof, said inkjet receiver coating being free or substantially free from said thermosetting resin, or comprising less than 20% by weight of said thermosetting resin. It is clear that the preferred embodiments of the methods of the invention give rise to equivalent preferred embodiments for treated paper layers, which are preferably suitable for inkjet printing by means of pigment containing water based inks.

BRIEF DESCRIPTION OF THE DRAWINGS

With the intention of better showing the characteristics according to the invention, in the following, as an example without limitative character, an embodiment is described, with reference to the accompanying drawings, wherein:

FIGS. 3 and 4 show a decorative panel obtainable by means of the method of FIG. 2, wherein FIG. 3 is a perspective view of said panel, and FIG. 4 is a cross section at a larger scale along the line IV-IV in FIG. 3;

DESCRIPTION OF NON-LIMITING EMBODIMENTS

Figure 1:
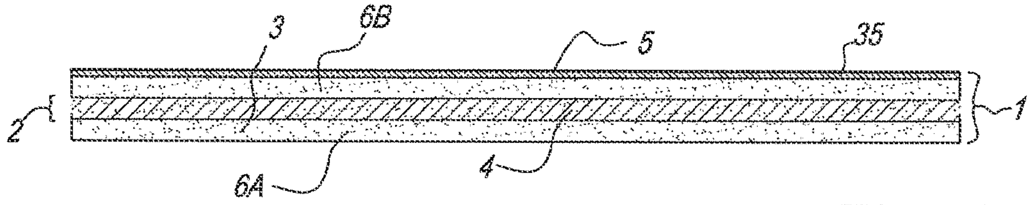
FIG. 1 shows an embodiment of a paper layer that has been printed in accordance with the method of the invention.

FIG. 1 illustrates a decorative layer 1 for incorporation in a decorative panel, obtainable by means of a method in accordance with the invention. The decorative layer 1 comprises a paper sheet 2 provided with thermosetting resin 3. The thermosetting resin 3 satisfies or fills the paper core 4. The paper layer has been provided with a digitally printed ink layer 5 on the basis of pigment containing inks, wherein for these inks use is made of water based pigment containing inks and an ink load lower than 9 grams per square meter area of the paper sheet 2. The printed ink layer 5 covers the entire surface of the paper sheet 2, or at least the majority thereof.

FIG. 1 also clearly shows that at least at the side opposite the digitally printed ink layer the decorative layer 1 comprises a resin layer 6A outside the paper core 4. At the side that contains said digitally printed ink layer 5 a similar resin layer 6B is available. Possibly such resin layer 6B can be dispensed with, or the available resin layer 6B may be thinner, for example less than half the thickness of the resin layer 6A.

From FIG. 1 it is clear that the digitally printed ink layer 5 covers the majority of the papers surface. Such print might for example represent a wood pattern, a stone pattern or a fantasy pattern.

Figure 3:
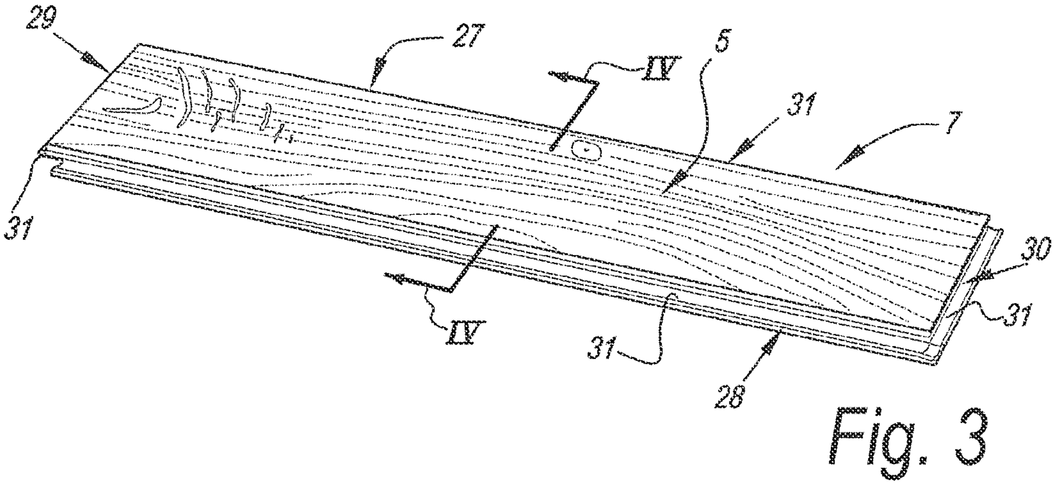
Figure 4:
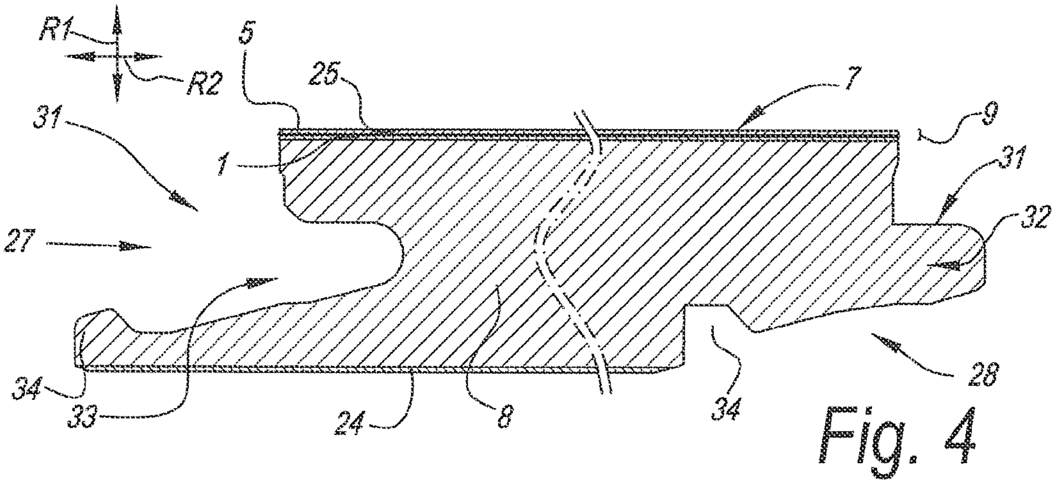
Figure 2:
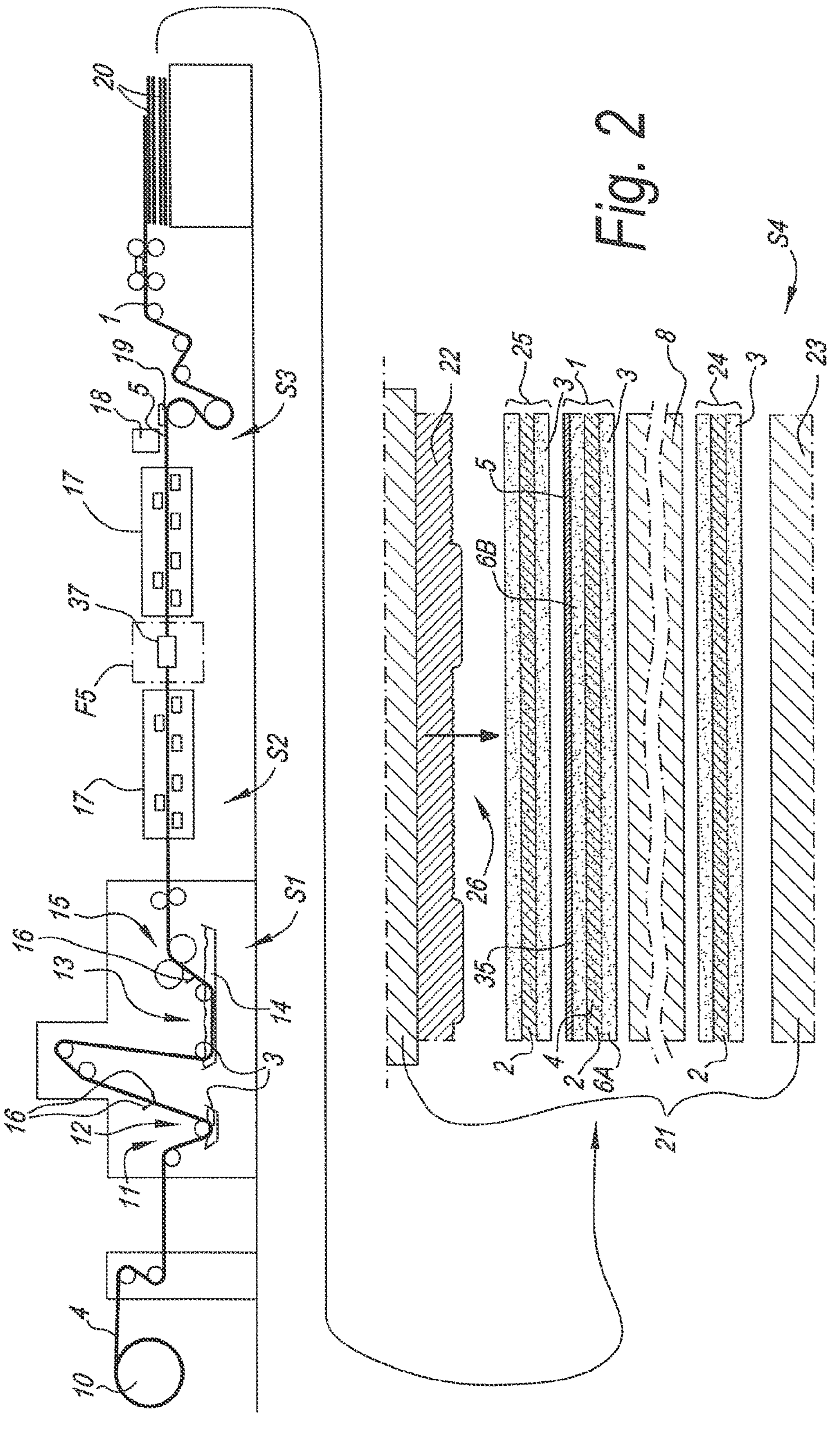
FIG. 2 illustrates some steps of a method in accordance with the invention.

FIG. 2 illustrates a method for manufacturing decorative panels 7 of the type shown in FIGS. 3 and 4. The obtained decorative panels 7 at least comprise a substrate 8 and a top layer 9. The top layer comprises a paper layer 2 with a printed pattern or a digitally printed ink layer 5 representing a wood pattern, as is the case here. The method comprises at least the step S1 of providing said paper layer 2 with thermosetting resin 3. Hereto the paper layer 2 is taken from a roll 10 and transported to a first impregnation station 11 where said paper layer is immersed in a bath 12 of said resin 3, more particularly a mixture of water and resin 3. The paper layer 2 is then allowed to rest while in this case being transported upwards. The resting allows for the resin 3 to penetrate the paper core 4. The paper layer 2 then comes into a second impregnation station 13 where the paper layer 2 is, in this case, again immersed in a bath 14 of resin 3, more particularly a mixture of water and resin 3. A set of squeezing rollers 15 allows to dose the amount of resin 3 applied to the paper layer 2.

In the example several doctor blades 16 are available for partially removing resin at the surface of the treated paper layer 2.

In a second step S2 the resin provided paper layer 2 is dried and its residual humidity level is brought to below 10%. In the example hot air ovens 17 are used, but alternatively other heating equipment can be used, such as microwave drying equipment.

FIG. 2 also illustrates that the method at least comprises the step S3 of providing said resin provided paper layer 2 with a printed pattern, in this case a digitally printed ink layer 5 representing a wood pattern. Use is made of pigment containing inks, that are deposited on the paper layer 2 by means of a digital inkjet printer 18, in this case a single pass inkjet printer having print heads extending over the width of the paper layer 2. The dry weight of the total volume of pigment containing inks deposited on said paper layer 2 is lower than 9 grams per square meter. The inkjet printer is preferably a drop on demand printer that allows to dry the deposited droplets of pigmented ink, e.g. by means of infrared or near infrared light. Preferably a further drying station 19 is provided downstream of the printer 18. After printing and drying the inks the continuous paper layer 2 is cut to sheets 20 and stacked. The obtained sheets 20 resemble the decorative layer 1 illustrated in FIG. 1.

According to a non illustrated variant the step of the printing S3 and/or the curing of the ink might be carried out after the resin provided paper layer 2 is already cut to sheets 20.

According to still another non illustrated variant, the resin provided paper layer 2 might be rolled up again before cutting it to sheets and/or before printing.

FIG. 2 further illustrates that in a subsequent step S4 the obtained sheets 20 or the decorative layer 1 is taken up in a stack to be pressed in a short daylight press 21 between upper and lower press plates 22-23. Said stack comprises from bottom to top a counter layer 24, a plate shaped substrate 8, the abovementioned decorative layer 1 and a protective layer 25, wherein the counter layer 24 and the protective layer 25 both comprise a paper layer 2 and resin 3. The stack is then pressed and the press treatment results in a mutual connection between the constituent layers 1-8-24-25, including the substrate 8, of the stack, as well as in a hardening or curing of the available resin 3. More particularly here a polycondensation reaction of the melamine-formaldehyde resin 3 takes place, having water as a by-product.

The upper press plate 22 is a structured press plates that provides a relief in the melamine surface of the panel 1 during the same press treatment of the step S4, by bringing the structured surface 26 of the upper press plate 22 into contact with the melamine of the protective layer 25.

FIGS. 3 and 4 illustrate that the obtained decorative panel 7 can have the shape of a rectangular and oblong laminate floor panel, with a pair of long sides 27-28 and a pair of short sides 29-30 and having an HDF or MDF substrate 8. In this case the panel 7 is at long at least the long sides 27-28 with coupling means 31 allowing to lock the respective sides 27-28 together with the sides of a similar panel both in a direction R1 perpendicular to the plane of the coupled panels, as in a direction R2 perpendicular to the coupled sides and in the plane of the coupled panels. As illustrated in FIG. 4 such coupling means or coupling parts can basically have the shape of a tongue 32 and a groove 33, provided with additional cooperating locking means 34 allowing for said locking in the direction R2.

Referring again to FIG. 1, it becomes clear that the printed paper layer 2 illustrated there has been provided with an inkjet receiver coating 35, thereby illustrating the sixth measure mentioned in the introduction.

Figure 5:
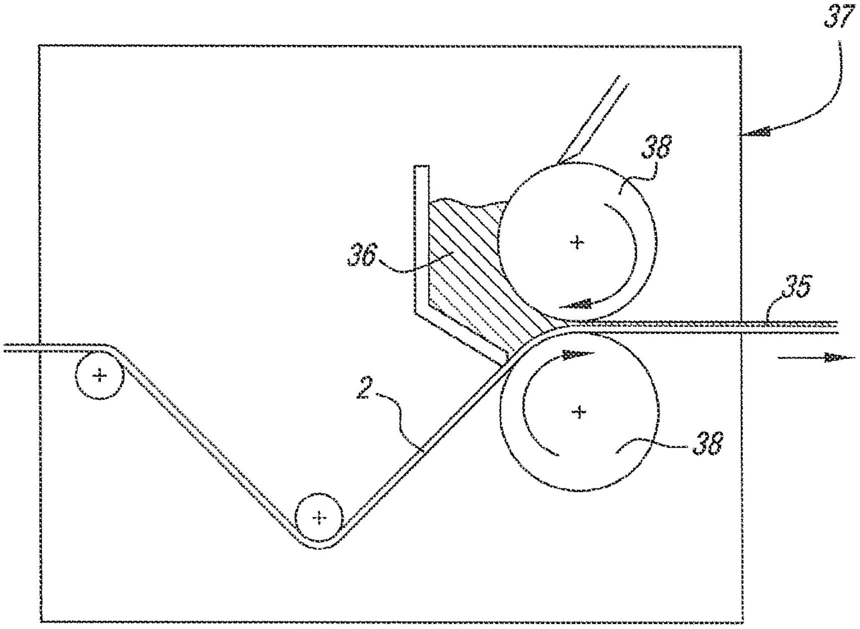
FIG. 5 on a larger scale shows a view on the area F5 indicated on FIG. 2 for a variant, wherein said sixth measure is put to practice.

FIG. 5 shows that, in accordance with a preferred embodiment, the inkjet receiver coating 35, is obtained by coating a liquid substance 36 to the resin provided paper layer 2. In this case a device 37 comprising reverse metering rollers 38 is applied. Such device 37 may initially apply an excess of the liquid substance 36, which is squeezed off to the desired weight by means of the rollers 38, which also may provide for a smooth coating surface.

From FIG. 2 it can be gleaned that the device 37 is present on the impregnation line, more particularly in this case after a drying operation, here performed by means of a hot air oven 17. Preferably, the resin provided paper layer possesses a residual humidity of below 10% by weight, or even lower than 6%, when the liquid substance 36, which is preferably a water based suspension of at least a polymer, is applied thereto. Preferably, and as is the case in FIG. 2, the treated paper layer 2 is then dried again, here again by means of a hot air oven 17, to reach once more a residual humidity level of below 10%, or of about 7%. The obtained treated paper comprises an inkjet receiver coating which is free from thermosetting resin.

The present invention is in no way limited to the above described embodiments, but such methods, equipment and treated paper layers may be realized according to several variants without leaving the scope of the invention.

What is claimed is:

1. A method for manufacturing a printed paper layer for use in laminate floor panels, the method comprising:

providing the paper layer with a printed pattern representing a wood pattern;

wherein providing the printed pattern involves depositing water based inks using a digital inkjet printer;

wherein the water based inks are pigment containing inks;

wherein the dry weight of the deposited pigment containing inks is lower than 9 grams per square meter;

wherein the paper layer at least includes an inkjet receiver coating, such that the inks are deposited on the inkjet receiver coating;

wherein the total volume of the deposited pigment containing inks is less than 15 milliliter; and wherein the printed pattern covers a majority of a surface of the paper layer;

wherein the paper layer is a non-white colored, pigmented, and/or dyed base paper.

2. The method according to claim 1, wherein the inkjet receiver coating includes a binder or a polymer and a pigment.

3. The method according to claim 2, wherein the binder is selected from the group consisting of polyvinyl alcohol, starch, gelatin, cationic additives, precipitated calcium carbonate, polymer latex, vinylacetate/ethylene copolymer, and carboxymethylcellulose.

4. The method according to claim 2, wherein the pigment to binder ratio in the inkjet receiver coating is between 10:90 and 90:10.

5. The method according to claim 2, wherein the polymer is a hydrophilic polymer.

6. The method according to claim 2, wherein the pigment/polymer ratio in the inkjet receiver coating is at least 2.

7. The method according to claim 2, wherein the pigment of the inkjet receiver coating is silica.

8. The method according to claim 2, wherein the pigment of the inkjet receiver coating has a mean particle size of 0.01 to 40 micrometer.

9. The method according to claim 1, wherein the inkjet receiver coating has a weight of 0.5 to 10 grams per square meter.

10. The method according to claim 1, wherein the paper layer is suitable for rotogravure.

11. The method according to claim 10, wherein the paper layer has a weight between 60 and 90 grams per square meter.

12. The method according to claim 1, wherein the inkjet receiver coating includes a pigment having a pore volume of 0.5 to 3 ml/g.

13. The method according to claim 1, wherein the paper layer comprises titanium oxide as a whitening agent.

14. The method according to claim 1, wherein the pigment containing inks include organic pigments.

15. The method according to claim 1, wherein the pigments of the pigment containing inks have an average particle size of less than 250 nanometer.

16. The method according to claim 1, wherein the total volume of the deposited pigment containing ink is less than 10 milliliter.

17. The method according to claim 1, wherein the dry weight of the deposited pigment containing ink is 5 grams per square meter or less.

18. The method according to claim 1, wherein the dry weight of the deposited pigment containing ink is 4 grams per square meter or less.

* * * * *